United States Patent
Ito et al.

(10) Patent No.: US 9,825,515 B2
(45) Date of Patent: Nov. 21, 2017

(54) SYNCHRONOUS RELUCTANCE MOTOR HAVING RADIAL-DIRECTION WIDTHS SLIT CONFIGURATION ON A Q-AXIS FOR IMPROVED POWER FACTOR

(71) Applicant: MITSUBISHI ELECTRIC CORPORATION, Chiyoda-ku (JP)

(72) Inventors: Kazumasa Ito, Chiyoda-ku (JP); Shinichi Yamaguchi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/108,167

(22) PCT Filed: Sep. 24, 2014

(86) PCT No.: PCT/JP2014/075200
§ 371 (c)(1),
(2) Date: Jun. 24, 2016

(87) PCT Pub. No.: WO2015/132991
PCT Pub. Date: Sep. 11, 2015

(65) Prior Publication Data
US 2016/0329787 A1    Nov. 10, 2016

(30) Foreign Application Priority Data
Mar. 5, 2014    (JP) .................................. 2014-042505

(51) Int. Cl.
*H02K 1/22* (2006.01)
*H02K 19/10* (2006.01)
(Continued)

(52) U.S. Cl.
CPC ............. *H02K 19/103* (2013.01); *H02K 1/22* (2013.01); *H02K 1/246* (2013.01); *H02P 21/00* (2013.01);
(Continued)

(58) Field of Classification Search
CPC ........ H02K 1/22; H02K 1/246; H02K 19/103; H02K 21/00; H02K 21/0003;
(Continued)

(56) References Cited

U.S. PATENT DOCUMENTS

| | | | | |
|---|---|---|---|---|
| 4,888,513 A | * | 12/1989 | Fratta ..................... | H02K 1/246 310/166 |
| 2002/0041127 A1 | * | 4/2002 | Naito .................. | H02K 1/2766 310/156.07 |

(Continued)

FOREIGN PATENT DOCUMENTS

| | | |
|---|---|---|
| JP | 5-78158 U | 10/1993 |
| JP | 7-274460 A | 10/1995 |

(Continued)

OTHER PUBLICATIONS

International Search Report dated Dec. 2, 2014, in PCT/JP2014/075200 Filed Sep. 24, 2014.

(Continued)

*Primary Examiner* — Bernard Rojas
*Assistant Examiner* — Rashad Johnson
(74) *Attorney, Agent, or Firm* — Oblon, McClelland, Maier & Neustadt, L.L.P.

(57) ABSTRACT

The rotation of the synchronous reluctance motor is controlled through energization of the winding with current of a phase having a ratio k between the total sum of radial-direction widths of the slits on the q-axis and a magnetic gap length, and having a lead angle β from the d-axis. Among the core layers, the radial-direction width, on the q-axis, of the core layer that lies at a position closest in the circumferential direction to a point P at which there intersect the outer periphery of the rotor and the straight line passing through the rotor center and drawn at an angle ψ=arctan(tan β/(1+

(Continued)

0.2k)) from the d-axis, is larger than the radial-direction width of other core layers on the q-axis.

12 Claims, 14 Drawing Sheets

(51) Int. Cl.
  *H02K 1/24*  (2006.01)
  *H02P 25/08*  (2016.01)
  *H02P 21/00*  (2016.01)
  *H02P 21/14*  (2016.01)
(52) U.S. Cl.
  CPC ........ *H02P 21/0003* (2013.01); *H02P 21/141* (2013.01); *H02P 25/08* (2013.01); *H02K 2201/09* (2013.01); *H02K 2213/03* (2013.01)
(58) Field of Classification Search
  CPC .. H02K 21/141; H02K 25/08; H02K 2201/09; H02K 2213/03
  USPC .......................................... 310/154, 156, 162
  See application file for complete search history.

(56) References Cited

U.S. PATENT DOCUMENTS

| | | | | |
|---|---|---|---|---|
| 2004/0150282 A1* | 8/2004 | Murakami | ............ | H02K 1/246 310/156.53 |
| 2007/0152527 A1* | 7/2007 | Yura | ............ | H02K 29/03 310/156.53 |
| 2008/0129243 A1 | 6/2008 | Nashiki | | |
| 2008/0211340 A1 | 9/2008 | Lee et al. | | |
| 2008/0290753 A1* | 11/2008 | Arimitsu | ............ | H02K 1/246 310/156.36 |
| 2011/0241466 A1* | 10/2011 | Takahashi | ............ | H02K 1/246 310/156.01 |
| 2012/0267977 A1* | 10/2012 | Merwerth | ............ | H02K 1/2766 310/156.53 |
| 2013/0147302 A1* | 6/2013 | Rahman | ............ | H02K 1/2766 310/156.32 |
| 2013/0147303 A1* | 6/2013 | Kaiser | ............ | H02K 1/2766 310/156.38 |
| 2013/0320796 A1* | 12/2013 | Vyas | ............ | H02K 1/2766 310/156.43 |
| 2013/0320797 A1* | 12/2013 | Vyas | ............ | H02K 1/2766 310/156.43 |
| 2014/0145539 A1* | 5/2014 | Huang | ............ | H02K 1/2766 310/156.53 |
| 2014/0152139 A1* | 6/2014 | Huang | ............ | H02K 21/16 310/156.38 |
| 2014/0167549 A1* | 6/2014 | Huang | ............ | H02K 1/246 310/156.07 |
| 2014/0167550 A1* | 6/2014 | Huang | ............ | H02K 1/2766 310/156.19 |
| 2014/0175932 A1* | 6/2014 | Huang | ............ | H02K 1/246 310/156.38 |
| 2014/0191607 A1* | 7/2014 | Huang | ............ | H02K 1/246 310/156.08 |
| 2015/0229170 A1* | 8/2015 | Koechlin | ............ | H02K 1/2766 310/156.53 |
| 2015/0303749 A1* | 10/2015 | Okubo | ............ | H02K 29/03 310/156.38 |

FOREIGN PATENT DOCUMENTS

| | | |
|---|---|---|
| JP | 11-127560 | 5/1999 |
| JP | 2001-231230 A | 8/2001 |
| JP | 2003-259615 A | 9/2003 |
| JP | 2004-56936 A | 2/2004 |
| JP | 2004-88852 A | 3/2004 |
| JP | 2004-96808 A | 3/2004 |
| JP | 2008-141835 A | 6/2008 |
| JP | 2011-147255 A | 7/2011 |

OTHER PUBLICATIONS

Preliminary Notice of Reasons for Rejection dated Aug. 4, 2015 in Japanese Patent Application No. 2015-527711 (with English-language Translation).

Decision of Allowance dated Dec. 1, 2015 in Japanese Patent Application No. 2015-527711 (with English-language Translation).

* cited by examiner

SYNCHRONOUS RELUCTANCE MOTOR HAVING RADIAL-DIRECTION WIDTHS SLIT CONFIGURATION ON A Q-AXIS FOR IMPROVED POWER FACTOR

TECHNICAL FIELD

The present invention relates to a synchronous reluctance motor that relies on reluctance torque and that is used in factories, air conditioners, automobiles and the like, and more particularly to a configuration of a synchronous reluctance motor.

BACKGROUND ART

Synchronous reluctance motors are motors in which torque is generated by resorting to a configuration in which magnetoresistance varies in the rotation direction of the rotor, through formation of slit-like flux barriers in the rotor core. Compared with induction motors (induction machines), synchronous reluctance motors are advantageous in that, for instance, there occurs no secondary copper loss in the rotor. The use of synchronous reluctance motors in factories, air conditioners, automobiles and the like has thus earned attention.

Synchronous reluctance motors, however, are usually considered to exhibit poor power factors, and further improvements on this score are required in order to be used in the above applications. The output torque of a synchronous reluctance motor, referred to as reluctance torque T, can be expressed according to Expression (1) below, where the generation principle is the abovementioned difference in the magnetoresistance in the rotation direction of the rotor.

$$T = Pn(Ld-Lq)idiq \quad (1)$$

In Expression (1), Pn is the number of pole pairs, Ld and Lq are d-axis and q-axis inductances, respectively, and id and iq are d-axis and q-axis currents, respectively.

Expression (1) reveals that increasing the difference Ld−Lq between d-axis and q-axis inductances is effective in terms of increasing efficiency by increasing the torque per current in the synchronous reluctance motor.

Moreover, as is known, it suffices to increase a ratio Ld/Lq between the d-axis and q-axis inductances to achieve an increase in the power factor of synchronous reluctance motors.

The value of the ratio Ld/Lq of the d-axis and q-axis inductances is generally referred to as salient pole ratio.

Thus, in order to increase the difference Ld−Lq between d-axis and q-axis inductances or the salient pole ratio Ld/Lq in a synchronous reluctance motor, configurations have been adopted in which a plurality of layers of slits referred to as flux barriers is provided in a rotor core, so that, as a result, d-axis magnetic paths are formed through which magnetic flux flows readily in a direction along the plurality of layers of slits, while magnetoresistance is increased in q-axis magnetic paths that cross the plurality of layers of slits.

In addition, technologies including the following which rely on the above flux barrier structure as a basic structure have been proposed in order to increase torque and enhance efficiency.

On the premise of controlling the stator so that magnetic flux that flows from the stator into the rotor does so towards the rotor center, a synchronous reluctance motor has been proposed for instance in which, in a rotor core obtained through stacking, in the rotor axial direction, of core sheets in which core layers (strips) are disposed so as to bulge towards the center, the radial-direction width of the core layers is set to be wider in central core layers of the rotor than in outer core layers of the rotor, and the radial-direction width of the slits is set to be wider in central slits of the rotor than in outer slits of the rotor or to be the same therebetween (see, for instance, PTL 1 (in particular, paragraphs [0002] to [0017], FIG. 2)).

In this synchronous reluctance motor, the core layers are set to be thicker on the rotor center side, where the magnetic flux flowing from the stator concentrates, and the torque of the motor can therefore be enhanced without the occurrence of magnetic saturation.

Another synchronous reluctance motor has for instance been proposed in which torque ripple can be reduced by setting the widths of a plurality of core layers (divided magnetic paths), which generate one flux barrier (magnetic path set), to be narrower at the center-side portion and outermost portion and to be wider at the middle portion within that flux barrier group (see, for instance, PTL 2 (in particular, paragraph [0021], FIG. 4)).

CITATION LIST

Patent Literature

[PTL 1] Japanese Patent Application Publication No. H11-127560
[PTL 2] Japanese Patent Application Publication No. 2004-96808

SUMMARY OF INVENTION

Technical Problem

In the conventional technologies, however, there are some issues that are yet to be resolved, including the following.

The synchronous reluctance motor of PTL 1 is premised on the stator being controlled such that the closer a core layer is to the center of the rotor, the greater is the flow of magnetic flux. However, PTL 1 does not address or disclose specific control conditions that are appropriate in order to increase efficiency by increasing torque; issues regarding control conditions for increasing efficiency have thus remained unresolved.

The synchronous reluctance motor of PTL 2 allows reducing torque ripples, but since no consideration is given to the magnitude of the average output torque thereof or to efficiency, issues regarding configurations for further increasing efficiency have remained unresolved.

In the light of the above issues, it is an object of the present invention to provide a synchronous reluctance motor that allows efficiency to be increased.

Solution to Problem

The synchronous reluctance motor according to the present invention is a synchronous reluctance motor provided with a rotor configured by fixing a rotor core to a shaft, and with a stator having winding, the rotor and the stator being disposed rotatably relative to each other across a magnetic gap, wherein the rotor core has as many flux barriers in the circumferential direction as the number of poles, the flux barriers being formed through alternate juxtaposition of one or more slits and core layers in the radial direction; rotation of the synchronous reluctance motor is controlled through energization of the winding with current of a phase having a ratio k between the total sum of radial-direction widths of the slits on the q-axis and a magnetic gap length, and having a lead angle β from the d-axis; and among the core layers, the radial-direction width, on the q-axis, of the core layer that lies at a position closest in the circumferential direction to a point P at which there intersect the outer periphery of the rotor and a straight line passing through the rotor center and drawn at an angle ψ=arctan(tan β/(1+0.2k)) from the d-axis, is larger than the radial-direction width of other core layers on the q-axis of other core layers; and the ratio k is set to a value higher than 34 and lower than 67.

Advantageous Effects of Invention

In the synchronous reluctance motor according to the present invention, the radial-direction width, on the q-axis, of the core layer lying at the closest position, in the circumferential direction, to the point P at which there intersect the outer periphery of the rotor and a straight line drawn at an angle ψ from the d-axis and that passes through the rotor center, is larger than the radial-direction width, on the q-axis, of the other core layers.

As a result, the core layer lying at a position where the magnetic flux flowing into the rotor from the stator is maximal is set to be thick, and magnetic saturation of this core layer is avoided, whereby d-axis inductance can be increased and large torque can be generated.

It becomes therefore possible to increase the efficiency of the synchronous reluctance motor.

DESCRIPTION OF EMBODIMENTS

Preferred embodiments of the synchronous reluctance motor according to the present invention will be explained next with reference to accompanying drawings. In the explanation, identical or corresponding portions across the drawings will be denoted by the same reference symbols.

Embodiment 1

Figure 1:
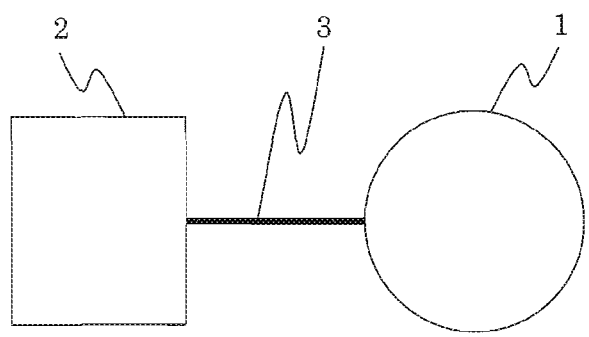
FIG. 1 is a configuration diagram illustrating a system in which there is used a synchronous reluctance motor according to Embodiment 1 of the present invention.

FIG. 1 is a configuration diagram illustrating a system in which there is used the synchronous reluctance motor 1 according to Embodiment 1 of the present invention. In FIG. 1, a synchronous reluctance motor 1 is an electric machine, connected to a control device 2 via a power source supply line 3, and which converts electrical energy supplied from the control device 2 to mechanical energy.

Figure 2:
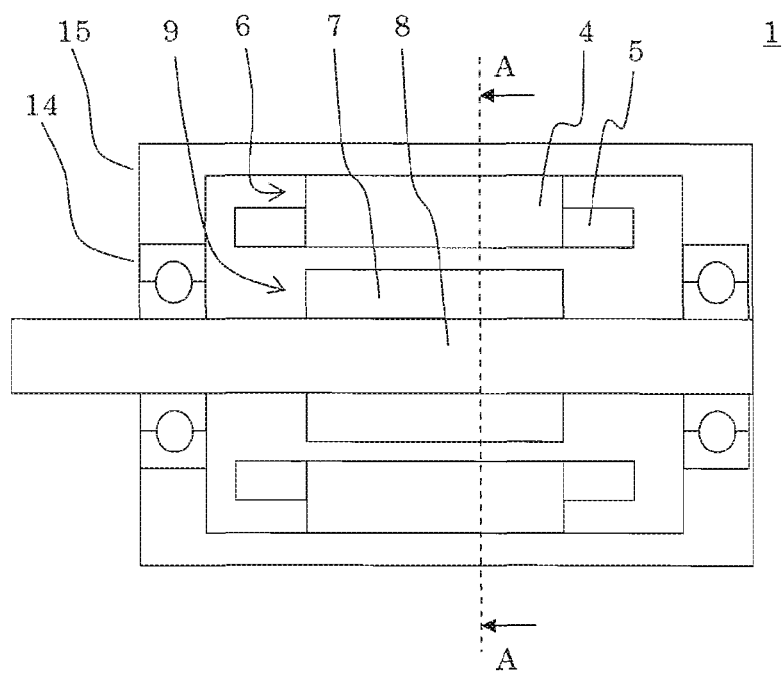
FIG. 2 is a cross-sectional diagram illustrating the synchronous reluctance motor according to Embodiment 1 of the present invention cut along the axial direction.

FIG. 2 is a cross-sectional diagram illustrating the synchronous reluctance motor 1 according to Embodiment 1 of the present invention cut along the axial direction. In FIG. 2, a stator 6 and a rotor 9, which are inserted into and fixed to a frame 15 in accordance with a method such as press-fitting or shrink-fitting, are disposed rotatably relative to each other across a mechanical clearance (magnetic gap), using bearings 14.

The stator 6 is configured by providing winding 5 on a stator core 4 made up of an iron core. A rotation magnetic field is generated in the magnetic gap through application of electrical energy, supplied by the control device 2, to the winding 5. The rotor 9 is integrated through insertion of a shaft 8, by press-fitting or shrink-fitting, into the center of a rotor core 7 made up of an iron core.

Figure 3:
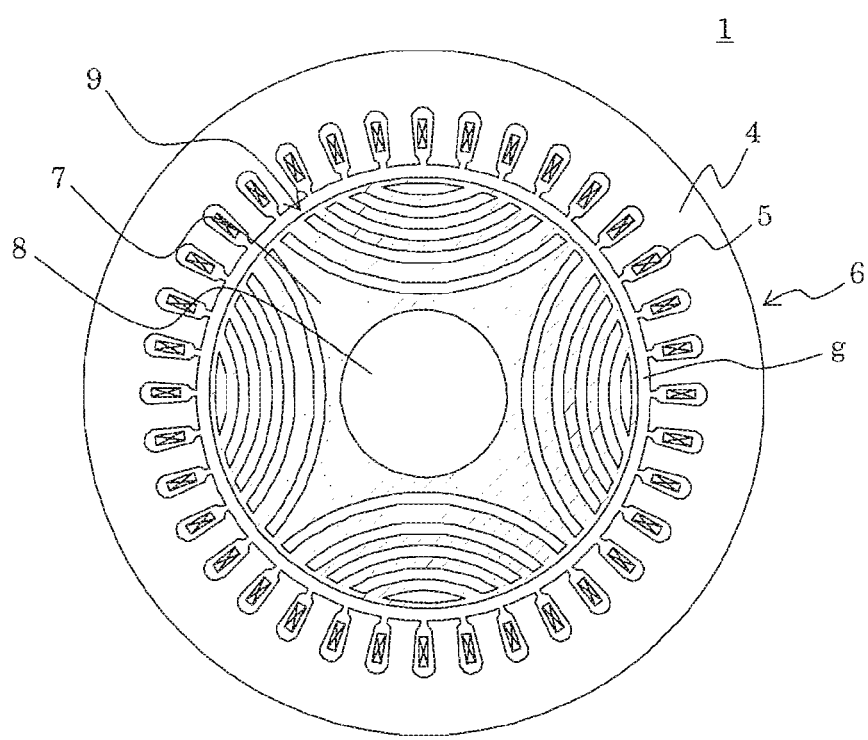
FIG. 3 is a cross-sectional diagram of the synchronous reluctance motor according to Embodiment 1 of the present invention cut along line A-A in FIG. 2.

FIG. 3 is a cross-sectional diagram of the synchronous reluctance motor 1 according to Embodiment 1 of the present invention cut along line A-A in FIG. 2. In FIG. 3, the stator 6 and the rotor 9 are disposed substantially concentrically, with a radial-direction distance g (gap length) of mechanical clearance kept therebetween.

Figure 4:
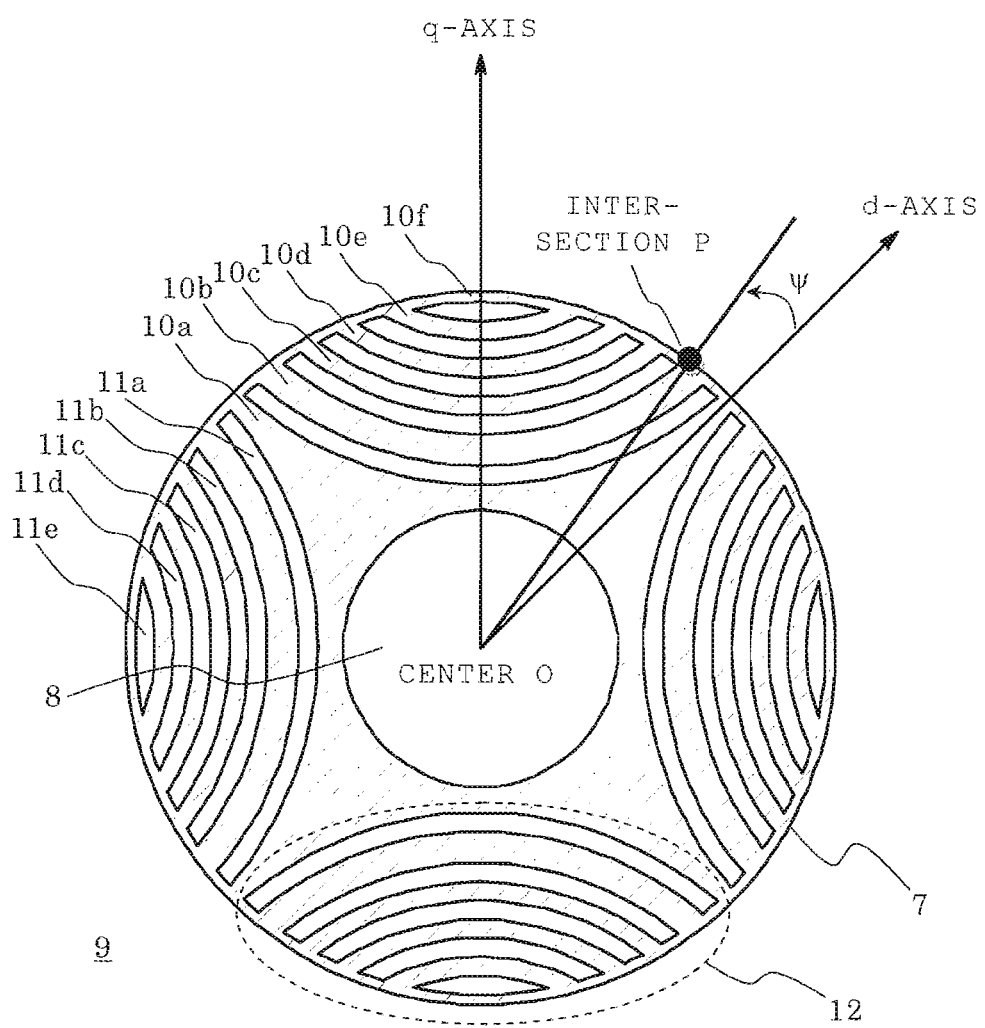
FIG. 4 is a cross-sectional diagram of the synchronous reluctance motor according to Embodiment 1 of the present invention with the rotor removed.

FIG. 4 is a cross-sectional diagram illustrating the synchronous reluctance motor 1 according to Embodiment 1 of the present invention, with the rotor 9 (rotor portion in FIG. 3) removed. In FIG. 4, four flux barriers 12 of identical shape are formed in the rotor core 7 substantially equidistantly in the circumferential direction. Therefore, the synchronous reluctance motor 1 according to Embodiment 1 of the present invention is configured to be drivable as a four-pole motor.

In each of the flux barriers 12, five slits 11 (11a to 11e) formed of a material different from the iron core that makes up the rotor core 7 are lined up forming rows in the radial direction, while the remaining iron core portion constitutes core layers 10a to 10f. The number of slits 11 is not limited to five and may be some other number.

Herein, one of the slits 11 is formed such that at least the radial direction width thereof in on the q-axis is largest. Preferably, the slits 11 maintain the same width from one end to the other end in the longitudinal direction. In some instances, however, the same width cannot be maintained in the outermost periphery of the rotor 9, for instance as in the case of the slit 11e. The ends of the slits 11 may be chamfered to be arc-shaped, and such chamfering is allowable.

In a cross-section of the rotor core 7 in FIG. 4, the d-axis is defined as a direction in which magnetic flux flows readily, and the q-axis is defined as a direction in which magnetic flux does not flow readily. The d-axis and the q-axis exhibit a 90-degree electrical phase difference. An intersection P is defined herein between the outer periphery of the rotor 9 and a straight line that runs through a rotor center O and is electrically rotated by an angle $\psi$ with respect to the d-axis.

The radial-direction width, on the q-axis, of the core layer 10b that is formed at the closest position to the intersection P along the circumferential direction, is formed to be thicker than the radial-direction width of the other core layers 10 on the q-axis.

The angle $\psi$ will be explained next. In the synchronous reluctance motor 1 according to Embodiment 1 of the present invention, as mentioned above, the current that flows through the winding 5 of the stator 6 is controlled by the control device 2 illustrated in FIG. 1.

Figure 5:
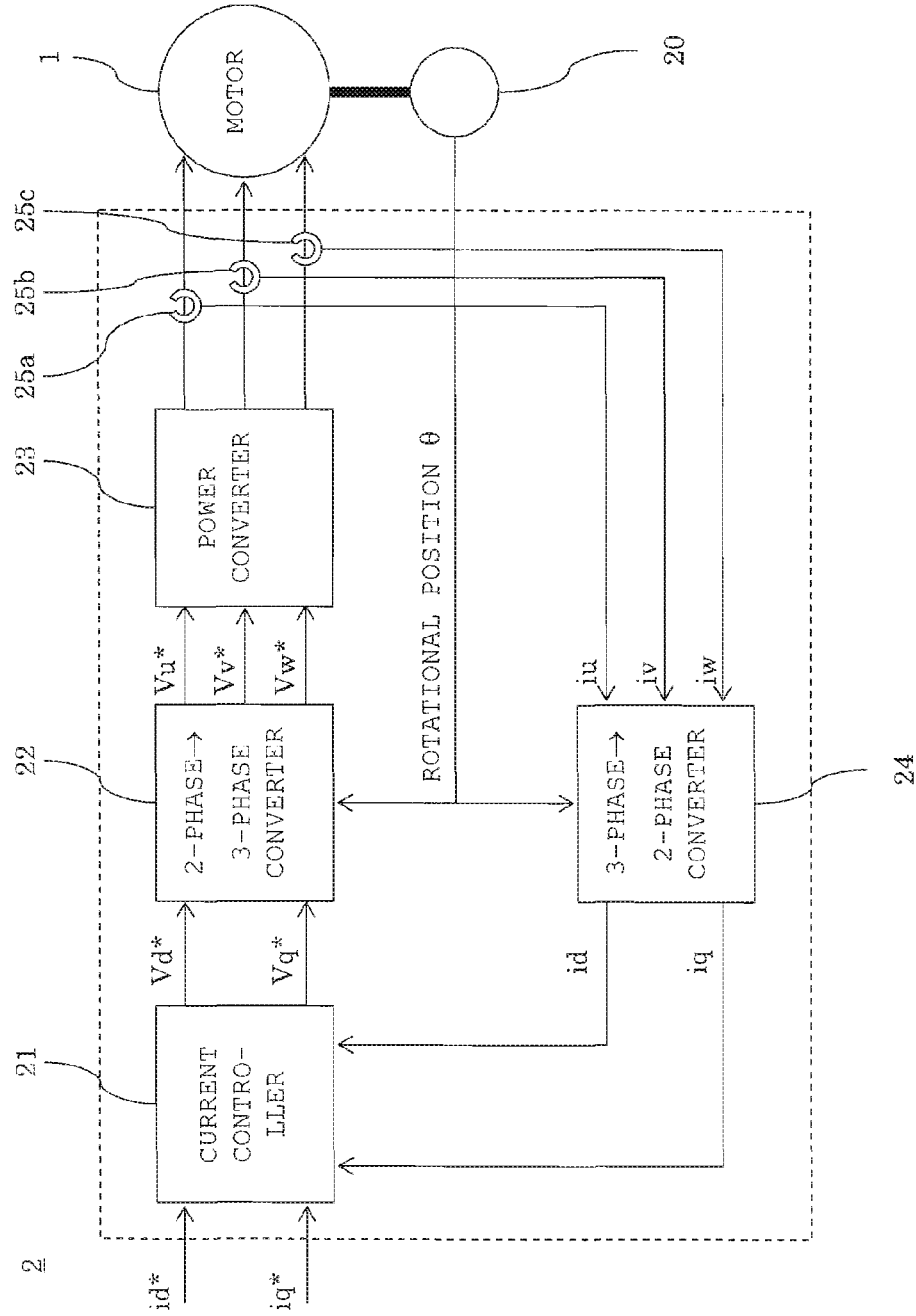
FIG. 5 is a block diagram illustrating a control device that drives and controls the synchronous reluctance motor according to Embodiment 1 of the present invention.
Figure 6:
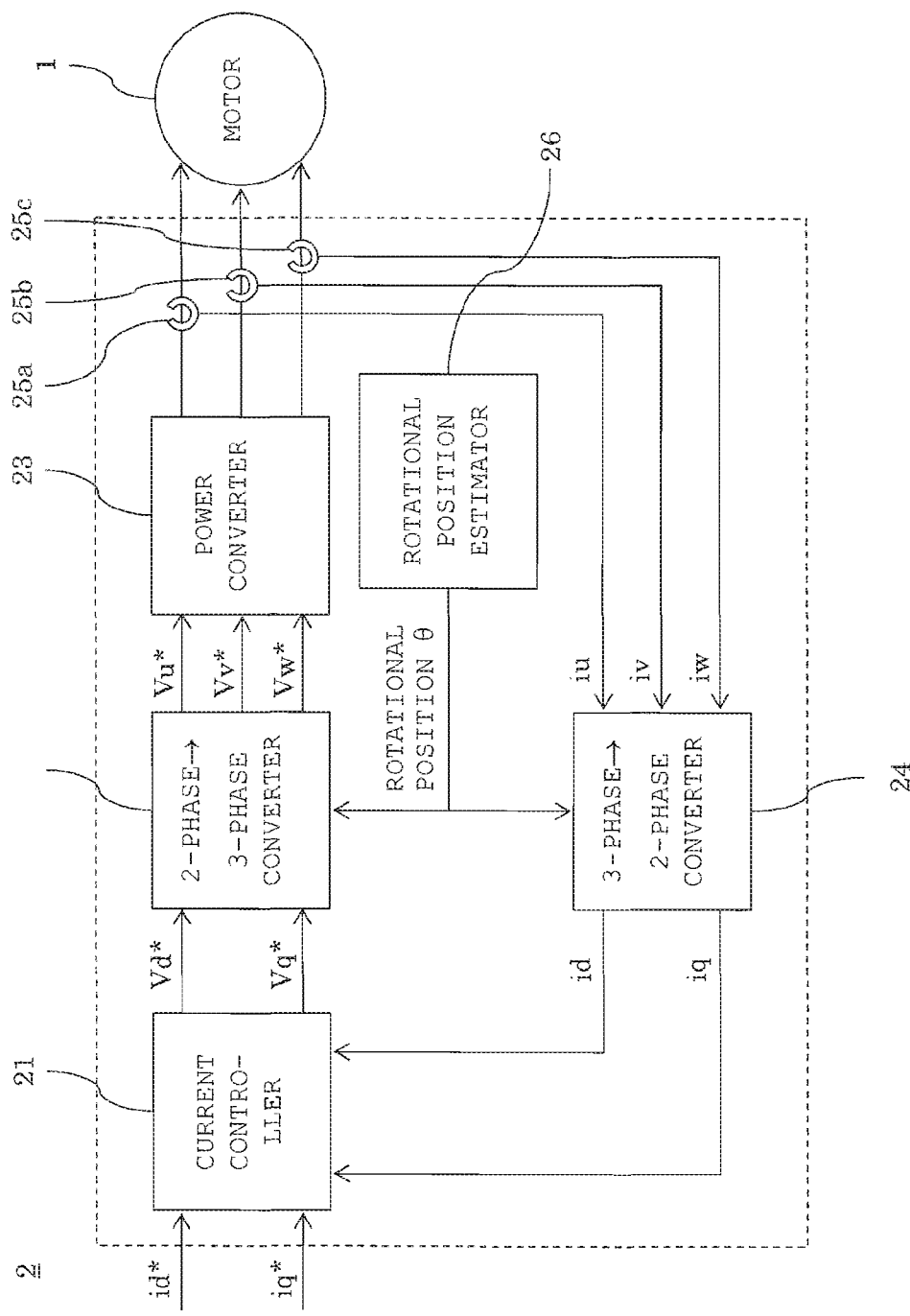
FIG. 6 is another block diagram illustrating a control device that drives and controls the synchronous reluctance motor according to Embodiment 1 of the present invention.

FIG. 5 is a block diagram illustrating the control device 2 that drives and controls the synchronous reluctance motor 1 according to Embodiment 1 of the present invention. FIG. 6 is another block diagram illustrating the control device 2 that drives and controls the synchronous reluctance motor 1 according to Embodiment 1 of the present invention. FIGS. 5 and 6 are block diagrams of so-called vector control.

In FIG. 5, a rotational position detector 20 connected to the synchronous reluctance motor 1 and that detects the rotational position of the rotor 9 transmits a rotational position $\theta$ to the control device 2. The rotational position detector 20 may be replaced by a rotational position estimator 26 disposed within the control device 2, as illustrated in FIG. 6.

Using the rotational position detector 20 is advantageous in that the position of the rotor is detected with high precision. On the other hand, using the rotational position estimator 26 is advantageous in that, although detection precision is poorer than in the case of the rotational position detector 20, the number of parts involved is smaller, which translates into better economy. An appropriate synchronous reluctance motor 1 can be thus provided by selecting the foregoing according to the intended application.

To control the synchronous reluctance motor 1, current is controlled on the basis of current commands id* and iq* issued internally or from outside the control device 2. In specific terms, firstly the values of three phase currents iu, iv and iw obtained from a current detector 25 are input, together with the rotational position $\theta$, to a three-phase to two-phase converter 24.

Next, two phase currents id and iq computed as the output of the three-phase to two-phase converter 24 are input, as feedback information, to a current controller 21. Voltage commands Vd* and Vq* are computed next on the basis of the two phase currents id and iq and the current commands id* and iq* in accordance with a method such as PID control in the current controller 21, and the computed voltage commands Vd* and Vq* are output.

The output voltage commands Vd* and Vq* are input, together with the rotational position $\theta$, to a two-phase to three-phase converter 22, and voltage commands Vu*, Vv* and Vw* for the three phases are computed and output. The voltage commands Vu*, Vv* and Vw* for the three phases are input to a power converter 23, which outputs the power to be supplied to the synchronous reluctance motor 1. Control is thus performed so as to reduce the difference between the two phase currents id and iq and the current commands id* and iq*.

Figure 7:
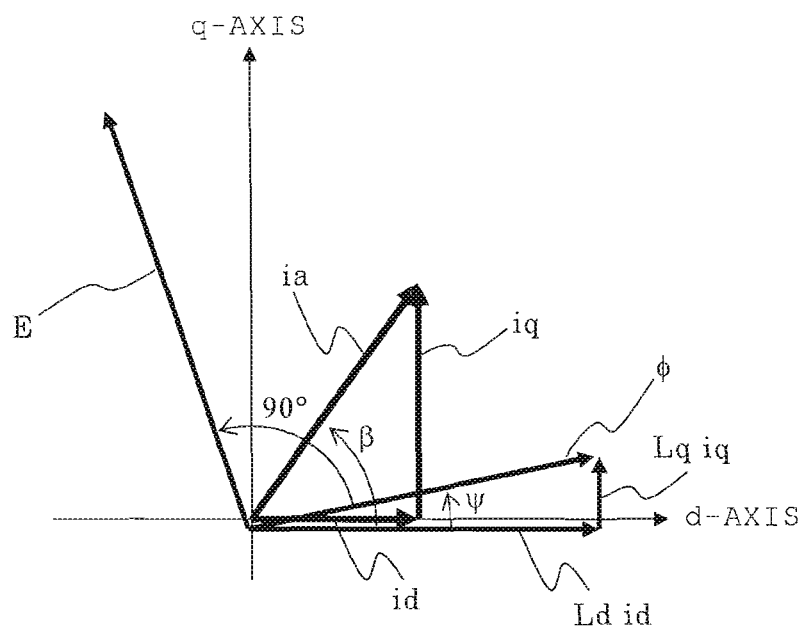
FIG. 7 is an explanatory diagram illustrating vectors of voltage, current and magnetic flux in the synchronous reluctance motor according to Embodiment 1 of the present invention.

The voltage that is applied to and the current that is caused to flow in the synchronous reluctance motor 1 will be explained next on the basis of a vector diagram. FIG. 7 is an explanatory diagram illustrating vectors of voltage, current and magnetic flux in the synchronous reluctance motor 1 according to Embodiment 1 of the present invention.

When flow of the two phase currents id and iq is prompted by the control device 2, magnetic fluxes Ldid and Lqiq are generated on account of the presence of d-axis inductance Ld and q-axis inductance Lq in the motor. Magnetic flux $\phi$ being the vector sum of the foregoing flows in the synchronous reluctance motor 1. Through rotation of the synchronous reluctance motor 1, an induced voltage E is induced that is electrically ahead of the magnetic flux $\phi$ by 90 degrees.

The angle formed by the d-axis and the vector that denotes the magnetic flux $\phi$ is the angle $\psi$. The angle $\psi$ is given by Expression (2) below using the magnetic fluxes Ldid and Lqiq.

$$\psi = \arctan(Lq \cdot iq / (Ld \cdot id)) \quad (2)$$

Herein the angle β is defined as the angle formed by current id and current ia, which is the vector sum of the two phase currents id and iq. The angle β is referred to as the current carrying phase (lead angle). Expressions (3) and (4) that utilize the angle β hold as set forth below.

$$id = ia \cdot \cos \beta \quad (3)$$

$$iq = ia \cdot \sin \beta \quad (4)$$

Expression (5) below can be obtained by substituting Expressions (3) and (4) into Expression (2) above.

$$\psi = \arctan(Lq/Ld \cdot \tan \beta) \quad (5)$$

Further, a ratio of the d-axis inductance Ld and the q-axis inductance Lq is defined as a salient pole ratio ζ, as given in Expression (6), with k being defined as the ratio of the total sum of the radial-direction width of the slits 11 on the q-axis and the gap length.

$$\zeta = Ld/Lq \quad (6)$$

Figure 8:
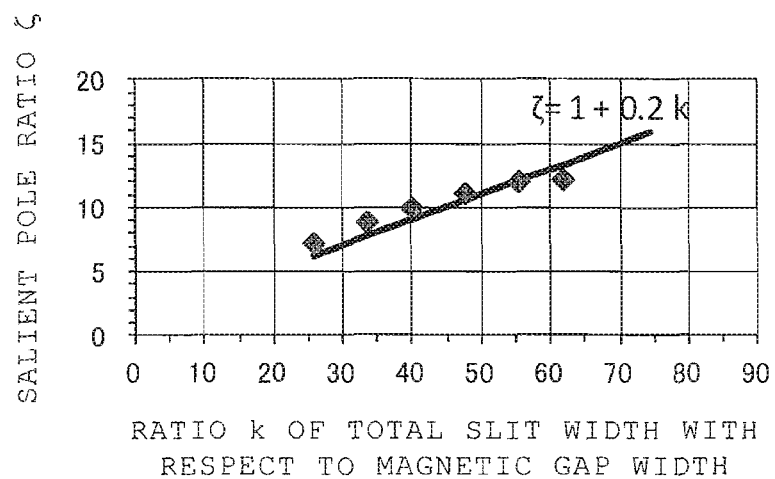
FIG. 8 is an explanatory diagram illustrating a relationship between salient pole ratio and a ratio of total slit width with respect to magnetic gap width, in the synchronous reluctance motor according to Embodiment 1 of the present invention.

A relationship such as the one of FIG. 8, i.e. a relationship such as the one of Expression (7), between the salient pole ratio ζ and the ratio k can be derived by electromagnetic field analysis relying on a finite element method. FIG. 8 is an explanatory diagram illustrating the relationship between the salient pole ratio ζ and the ratio k of total slit width with respect to magnetic gap width in the synchronous reluctance motor 1 according to Embodiment 1 of the present invention.

$$\zeta = 0.2k + 1 \quad (7)$$

Expression (8) below can be obtained by substituting Expressions (6) and (7) into Expression (5) above.

$$\psi = \arctan(\tan \beta / (1 + 0.2k)) \quad (8)$$

Figure 9:
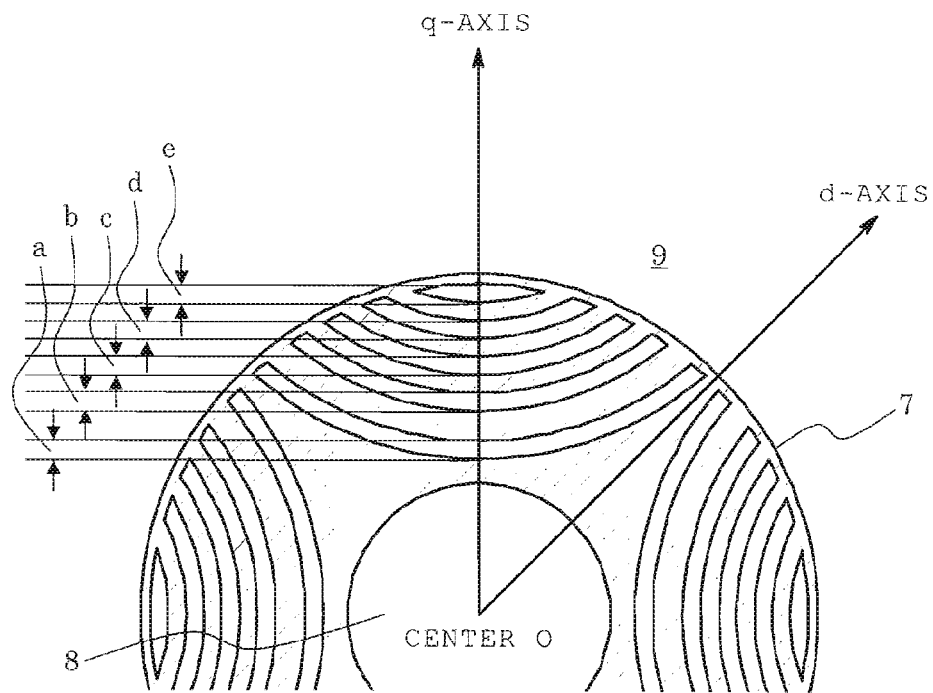
FIG. 9 is an explanatory diagram illustrating a radial direction width of slits on the q-axis, in the rotor of the synchronous reluctance motor according to Embodiment 1 of the present invention.

With reference to FIG. 9, the ratio k is given by Expression (9) below. FIG. 9 is an explanatory diagram illustrating the radial direction widths (a through e) of the slits 11 on the q-axis, for the rotor 9 of the synchronous reluctance motor 1 according to Embodiment 1 of the present invention.

$$k = (a + b + c + d + e)/g \quad (9)$$

In Expression (9), g denotes a gap length. Note that, while FIG. 9 illustrates an example in which the number of the slits 11 in the flux barriers 12 is five, and therefore the ratio k is given by Expression (9), the ratio k can be given adopting the same expression even when the number of the slits 11 is different to five, because the ratio k is, in any case, defined as the ratio of the total sum of the radial-direction width of the slits 11 on the q-axis and the gap length, irrespective of the number of the slits 11.

Figure 10:
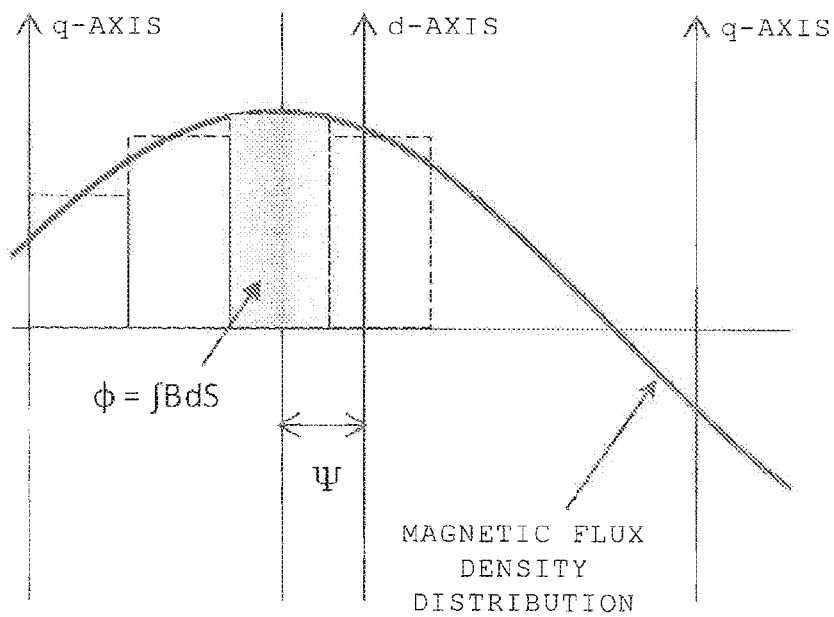
FIG. 10 is a schematic diagram illustrating a distribution of magnetic flux density generated at a gap surface in the synchronous reluctance motor according to Embodiment 1 of the present invention.

FIG. 10 is a schematic diagram illustrating the magnetic flux density generated at a gap surface i.e. illustrating the distribution of magnetic flux density that is induced in the magnetic gap, of the synchronous reluctance motor 1 according to Embodiment 1 of the present invention.

In FIG. 10, the magnetic flux density in the magnetic gap is distributed substantially sinusoidally, with a peak positioned offset from the d-axis by the angle ψ. A problem has been observed in that, since the magnetic flux amount flowing in the core layers 10 is the integral of the magnetic flux density, the magnetic flux amount that flows into a position removed by an angle ψ is greater than that at other positions, whereupon magnetic saturation occurs and output torque decreases.

In the synchronous reluctance motor 1 according to Embodiment 1 of the present invention, therefore, defining the intersection P of the outer periphery of the rotor 9 and a straight line that runs through the rotor center O and that is electrically rotated by the angle ψ from the d-axis, the radial-direction width, on the q-axis, of the core layer 10b that is formed at the closest position to the intersection P along the circumferential direction, was formed to be larger than the radial-direction width of the other core layers 10 on the q-axis. Herein, the angle ψ is an angle given by Expression (8) above on the basis of the current carrying phase β and the ratio k of the total radial-direction width of the slits on the q-axis with respect to the gap length.

In such a configuration, the radial direction width of the core layer 10 at the position closest to the position of the center at which the magnetic flux φ is induced is formed to be large. This allows eliciting the effect of making it possible to prevent decreases in torque due to magnetic saturation, and achieving better efficiency than in conventional instances.

In the configuration of Embodiment 1, the radial-direction width, on the q-axis, of the core layer 10 lying at the closest position, in the circumferential direction, to the point P at which there intersect the outer periphery of the rotor and a straight line drawn at an angle ψ from the d-axis and that passes through the rotor center, is larger than the radial-direction width of the other core layers 10 on the q-axis.

As a result, the core layer 10 at a position of maximal magnetic flux flowing into the rotor from the stator is set to be thick, and magnetic saturation of this core layer 10 is avoided; as a result, the d-axis inductance can be increased and large torque can be generated.

It becomes therefore possible to increase the efficiency of the synchronous reluctance motor.

Embodiment 2

The characterizing feature of Embodiment 2 of the present invention, in addition to that of Embodiment 1, is that herein the ratio k of the total radial-direction width of the slits on the q-axis with respect to the gap length is set to a value lower than 67.

Figure 11:
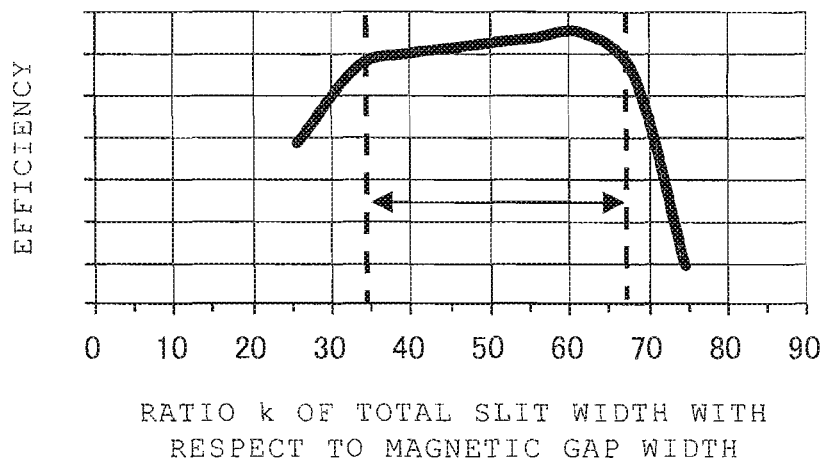
FIG. 11 is an explanatory diagram illustrating a relationship between efficiency and a ratio of total slit width with respect to magnetic gap width in a synchronous reluctance motor of Embodiments 2 and 3 of the present invention.

FIG. 11 is an explanatory diagram illustrating a relationship between efficiency and the ratio k of total slit width with respect to magnetic gap width in the synchronous reluctance motor 1 according to Embodiments 2 and 3 of the present invention. FIG. 11 illustrates a graph in which the ratio k of the total radial-direction width of the slits on the q-axis with respect to the gap length is represented on the horizontal axis and efficiency is represented on the vertical axis.

In FIG. 11, efficiency drops at a region where the ratio k of the total radial-direction width of the slits on the q-axis with respect to the gap length is higher than 67. This can be explained as follows. When the ratio k of the total radial-direction width of the slits on the q-axis with respect to the gap length is high, slit width in the rotor core 7 is large, and the core layers 10 are accordingly relatively narrow. When the core layers 10 become narrower, the magnetic path width of the d-axis magnetic path narrows as well, and magnetic saturation occurs readily as a result.

Defining the intersection P between the outer periphery of the rotor 9 and a straight line that runs through a rotor center O and is electrically rotated by an angle ψ with respect to the d-axis, as explained in Embodiment 1, magnetic saturation occurs, torque drops, and efficiency is impaired when the ratio k of the total radial-direction width of the slits on the q-axis with respect to the gap length is large, in excess of 67, even if the radial-direction width, on the q-axis, of the core layer 10b that is formed at the closest position to the intersection P along the circumferential direction is formed to be greater than the radial-direction width of the other core layers 10 on the q-axis.

Preferably, therefore, the ratio k of the total radial-direction width of the slits on the q-axis with respect to the gap length is kept to a value lower than 67. By adopting such a configuration it becomes possible to suppress magnetic saturation and achieve good efficiency.

Embodiment 3

The characterizing feature of Embodiment 3 of the present invention, in addition to that of Embodiment 1, is that herein the ratio k of the total radial-direction width of the slits on the q-axis with respect to the gap length is set to a value higher than 34.

In FIG. 11 described above, efficiency drops at a region where the ratio k of the total radial-direction width of the slits on the q-axis with respect to the gap length is lower than 34.

This can be explained as follows. When the ratio k of the total radial-direction width of the slits on the q-axis with respect to the gap length is reduced, the slit width in the rotor core 7 decreases as well, and the effect of preventing flux of q-axis magnetic flux is weakened. In other words, the q-axis inductance Lq increases, and torque cannot be output appropriately.

Defining the intersection P between the outer periphery of the rotor 9 and a straight line that runs through a rotor center O and is electrically rotated by an angle $\psi$ with respect to the d-axis, as explained in Embodiment 1, the q-axis inductance Lq increases, torque drops, and efficiency is impaired when the ratio k of the total radial-direction width of the slits on the q-axis with respect to the gap length is lower than 34, even if the radial-direction width, on the q-axis, of the core layer 10b that is formed at the closest position to the intersection P along the circumferential direction is formed to be greater than the radial-direction width of the other core layers 10 on the q-axis.

Preferably, therefore, the slits 11 are configured in such a manner that the ratio k of the total radial-direction width of the slits on the q-axis with respect to the gap length takes on a value higher than 34. Such a configuration allows reducing the q-axis inductance Lq and achieving good efficiency.

The q-axis inductance Lq can be reduced, while suppressing magnetic saturation and achieving good efficiency, by setting the ratio k of the total radial-direction width of the slits on the q-axis with respect to the gap length to be higher than 34 and lower than 67.

Embodiment 4

In Embodiment 1 the current carrying phase $\beta$ has not been explained in detail. Embodiment 4 of the present invention deals with an explanation of the current carrying phase $\beta$. As described above, $\beta$ is the angle formed by the current ia, which is the vector sum of the d-axis current id and the q-axis current iq. In order for rotation torque to be output, the motor must operate with the current carrying phase $\beta$ lying in the range given by Expression (10) below.

$$0 \text{ degrees} < \beta < 90 \text{ degrees} \tag{10}$$

PTL 1 recites "the closer the core layer is to the center of the rotor, the greater is the magnetic flux that flows". Accordingly, it can be estimated that the current carrying phase $\beta$ is close to 0 degrees. In Embodiment 4 of the present invention, by contrast, the current carrying phase $\beta$ is more preferably set to substantially 450 in order to maximize torque per current.

Figure 12:
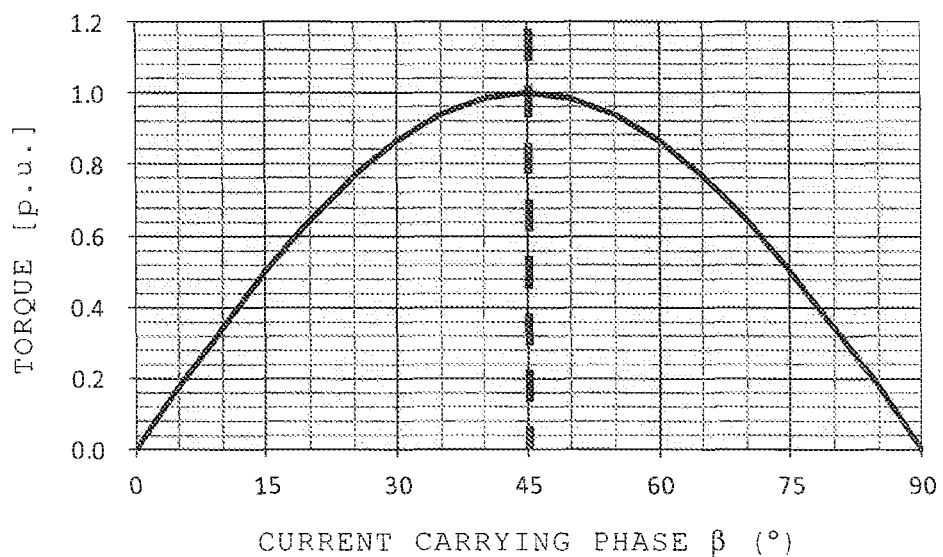
FIG. 12 is an explanatory diagram illustrating output torque with respect to a current carrying phase during constant-current energization of a synchronous reluctance motor according to Embodiment 4 of the present invention.

The effectiveness of this approach can be explained on the basis of the graph of Expression (1) illustrated in FIG. 12. FIG. 12 is an explanatory diagram illustrating output torque with respect to the current carrying phase $\beta$ during constant-current energization of the synchronous reluctance motor 1 according to Embodiment 4 of the present invention. FIG. 12 illustrates the manner in which the output torque varies with respect to the current carrying phase $\beta$. As FIG. 12 reveals, the torque takes on a maximum value at a current carrying phase $\beta$ of 45°. An effect can thus be elicited whereby good efficiency substantially can be achieved in the range 45°±5°.

Figure 13:
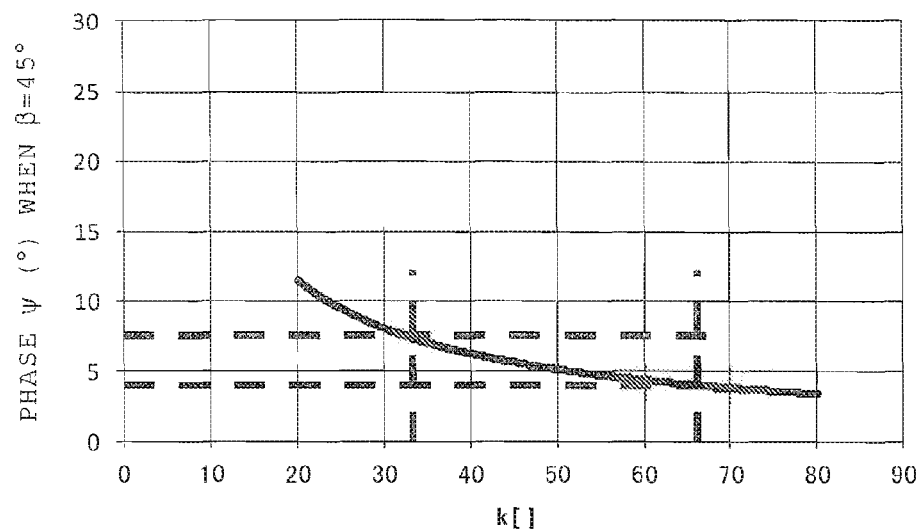
FIG. 13 is an explanatory diagram illustrating a relationship between angle ψ in a case where a current carrying phase is 450 and a ratio of total slit width with respect to magnetic gap width, in the synchronous reluctance motor according to Embodiment 4 of the present invention.

FIG. 13 is an explanatory diagram illustrating a relationship between the angle $\psi$ and the ratio k of total slit width with respect to magnetic gap width in a case where the current carrying phase $\beta$ is 45°, in the synchronous reluctance motor 1 according to Embodiment 4 of the present invention.

In FIG. 13, the appropriate range from 34 to 67 of the ratio k of the total radial-direction width of the slits on the q-axis with respect to the gap length, explained In Embodiments 2 and 3, corresponds to a range of angle $\psi=4$ to 7.5°. By adopting the above configuration an effect can be elicited of making it possible to further enhance the driving efficiency of the synchronous reluctance motor 1 through a combination with the control device 2.

Embodiment 5

The current carrying phase $\beta$ is preferably set in Embodiment 4 in the manner described below, in order to increase the power factor of the synchronous reluctance motor 1. Firstly, a power factor PF is given by Expression (11) below.

$$PF=\cos(\pi/2+\psi-\beta)=-\cos(\beta+\arctan((1+0.2k)/\tan\beta)) \tag{11}$$

Figure 14:
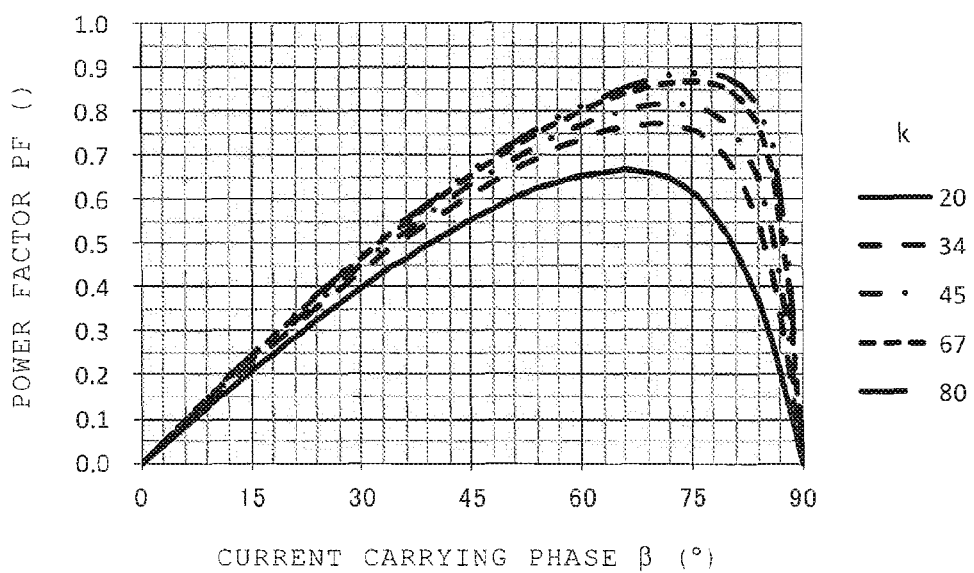
FIG. 14 is an explanatory diagram illustrating a relationship between power factor and current carrying phase in a synchronous reluctance motor according to Embodiment 5 of the present invention.

FIG. 14 illustrates graphs of Expression (11). FIG. 14 is an explanatory diagram illustrating a relationship between the power factor PF and the current carrying phase $\beta$ in the synchronous reluctance motor 1 according to Embodiment 5 of the present invention. In FIG. 14, the horizontal axis represents the current carrying phase $\beta$ and the vertical axis represents the power factor PF.

FIG. 14 illustrates curves for respective values of the ratio k of the total radial-direction width of the slits on the q-axis with respect to the gap length, ranging from 20 to 80. The curves for the respective values of ratio k take on a maximum value from about 66° to 75°. The power factor of energization is thus found to be best within this range. In practice, operation at a higher power factor is enabled through energization within a range from 560 to 850.

Figure 15:
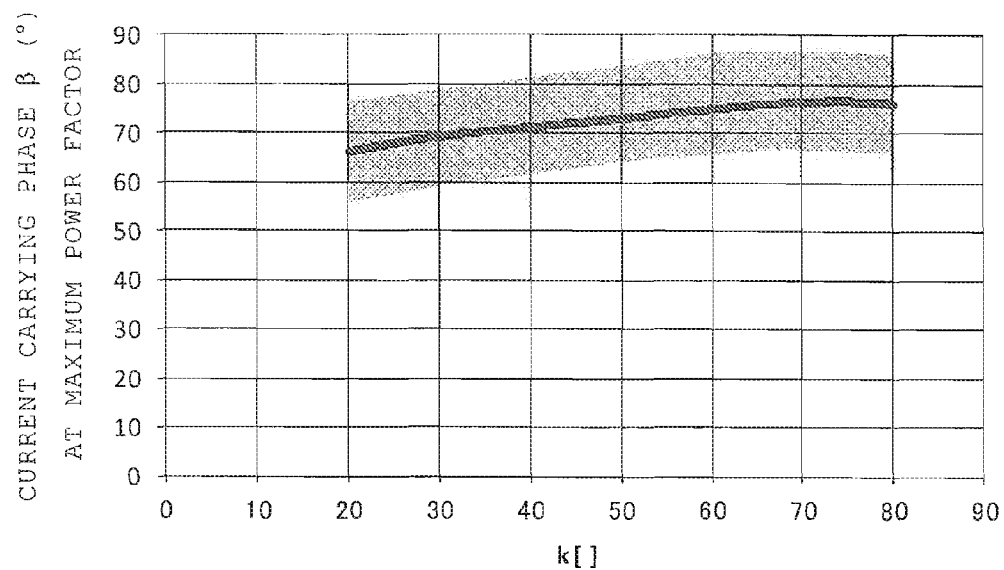
FIG. 15 is an explanatory diagram illustrating a relationship between a current carrying phase at which there is exhibited a maximum value of power factor in FIG. 14 and a ratio of total slit width with respect to magnetic gap width.

FIG. 15 is an explanatory diagram illustrating a relationship between the current carrying phase $\beta$ at which there is exhibited a maximum value of power factor in FIG. 14 and the ratio k of total slit width with respect to magnetic gap width. The current carrying phase $\beta$ at a time where the power factor is maximal is plotted as a function of the ratio k of the total radial-direction width of the slits on the q-axis with respect to the gap length. A range of ±100 above and below the current carrying phase $\beta$, and which is a non-problematic range in practice, is depicted with hatching.

Figure 16:
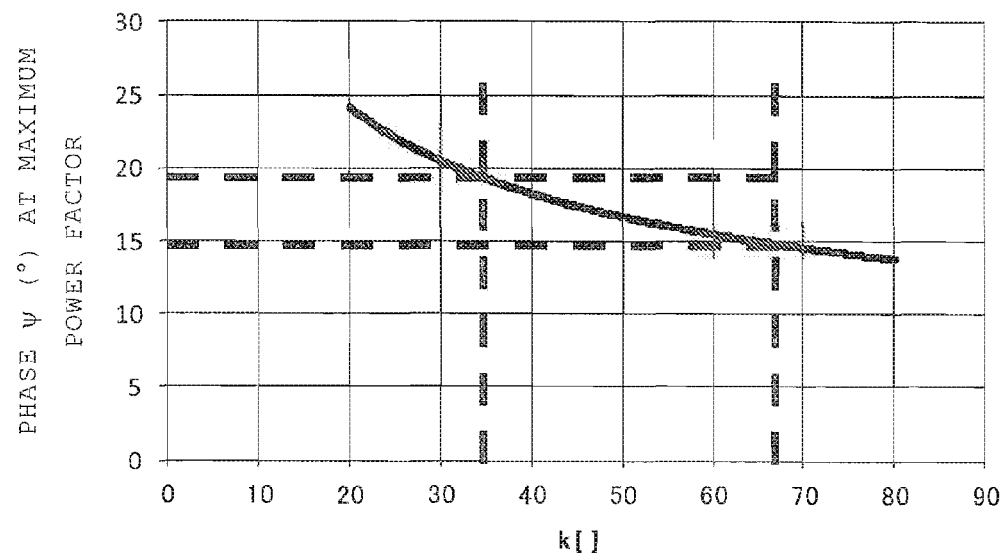
FIG. 16 is an explanatory diagram illustrating a relationship between angle ψ in a case where a current carrying phase takes on the value illustrated in FIG. 15 and a ratio of total slit width with respect to magnetic gap width, in the synchronous reluctance motor according to Embodiment 5 of the present invention.

FIG. 16 is an explanatory diagram illustrating a relationship between the angle $\psi$ and the ratio k of total slit width with respect to magnetic gap width in a case where the current carrying phase takes on a value illustrated in FIG. 15

(i.e. current carrying phase β at the time of maximal power factor), in the synchronous reluctance motor 1 according to Embodiment 5 of the present invention.

In FIG. 16, the appropriate range from 34 to 67 of the ratio k of the total radial-direction width of the slits on the q-axis with respect to the gap length, explained In Embodiments 2 and 3, corresponds to a range of angle ψ=15 to 20°. By adopting the above configuration an effect can be elicited of making it possible to increase the power factor and to further enhance the driving efficiency of the synchronous reluctance motor 1 through a combination with the control device 2.

Embodiment 6

The current carrying phase β is preferably set according to Expression (12) below in order to increase efficiency with maximum torque under a given applied voltage, in Embodiments 4 and 5.

$$\beta=\arctan(1+0.2k) \quad (12)$$

Expression (13) below sets forth the torque upon application of a given applied voltage V.

$$T=Pn/2(1/Lq-1/Ld)(V/\omega)^2 \sin(2 \arctan(\tan(\beta)/(1+0.2k))) \quad (13)$$

Expression (12) is obtained by deriving a relationship between the current carrying phase β and the ratio k of the total radial-direction width of the slits on the q-axis with respect to the gap length in a case where the torque given by Expression (13) is maximal, i.e. when the term of the sin function is 1. In Expression (13), Pn denotes the number of pole pairs of the synchronous reluctance motor 1, and ω denotes the angular frequency. The torque under a constant voltage condition can be thus maximized, and efficiency accordingly enhanced, when the current carrying phase β is controlled as in Expression (12).

Figure 17:
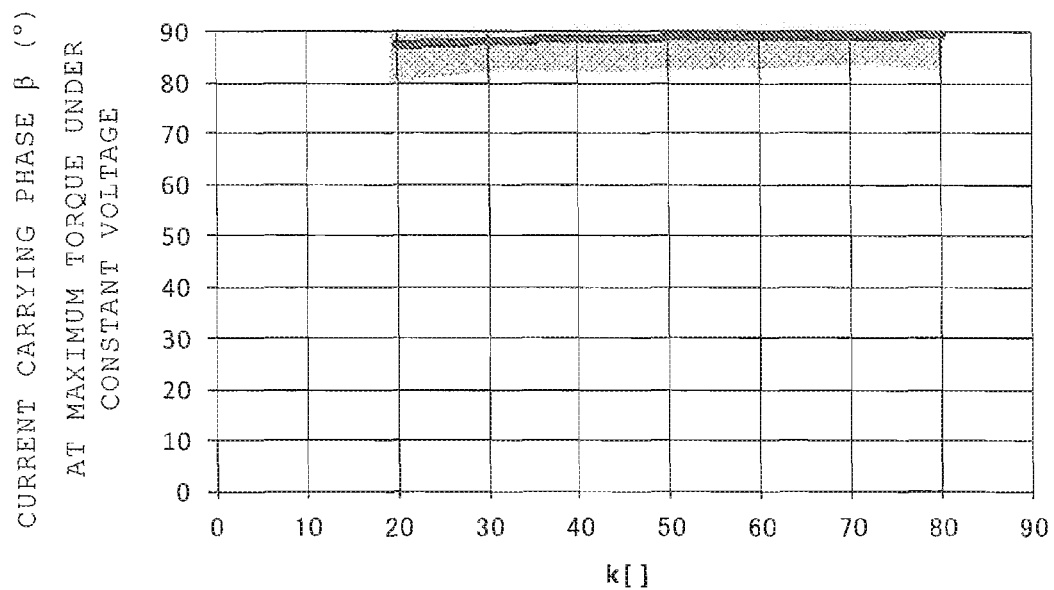
FIG. 17 is an explanatory diagram illustrating a relationship between a current carrying phase and a ratio of total slit width with respect to magnetic gap width in a synchronous reluctance motor according to Embodiment 6 of the present invention.

FIG. 17 illustrates a graph of Expression (13). FIG. 17 is an explanatory diagram illustrating a relationship between the current carrying phase and the ratio of total slit width with respect to magnetic gap width in the synchronous reluctance motor 1 of Embodiment 6 of the present invention. A range of ±50 above and below the current carrying phase β, and which is a non-problematic range in practice, is depicted with hatching.

The angle ψ is calculated in accordance with the expression below, on the basis of Expression (8) and Expression (12), and takes on a value of 450 when expressed in converted units.

$$\psi=\arctan(\tan(\arctan(1+0.2k))/(1+0.2k))=\pi/4(\mathrm{rad})$$

Therefore, Embodiment 6 of the present invention is an example in which, defining the intersection P of the outer periphery of the rotor 9 and a straight line that runs through the rotor center O and that is electrically rotated by the angle ψ=45° from the d-axis, the radial-direction width, on the q-axis, of the core layer 10b that is formed at the closest position to the intersection P along the circumferential direction, is formed to be larger than the radial-direction width of the other core layers 10 on the q-axis. By adopting the above configuration an effect can be elicited of making it possible to further enhance the driving efficiency of the synchronous reluctance motor 1 through a combination with the control device 2, also under a limited voltage condition.

Embodiment 7

Figure 18:
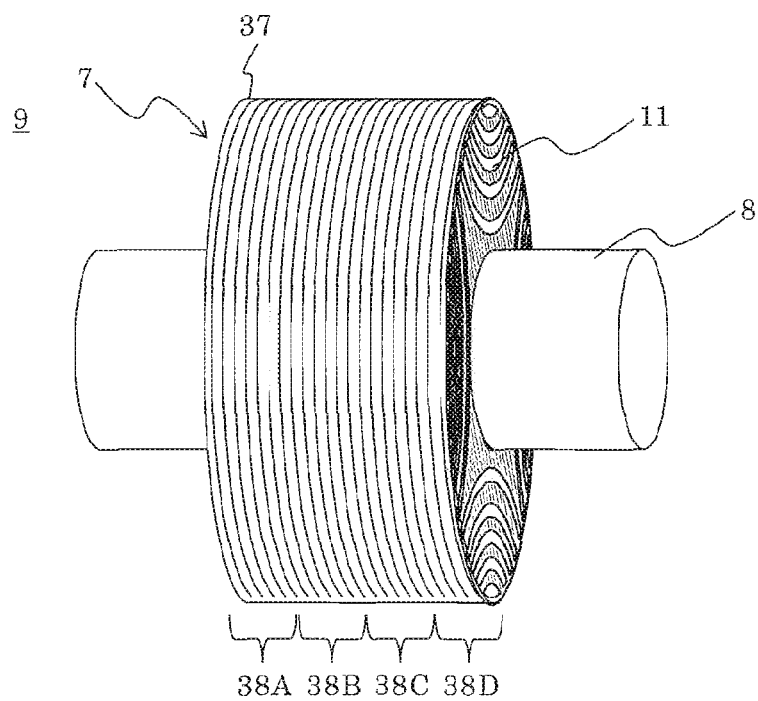
FIG. 18 is a perspective-view diagram illustrating the rotor of a synchronous reluctance motor according to Embodiment 7 of the present invention.

FIG. 18 is a perspective-view diagram illustrating the rotor 9 of the synchronous reluctance motor 1 according to Embodiment 7 of the present invention. In FIG. 18, the rotor core 7 is configured through stacking, with the positions the slits 11 aligned with respect to each other, of a desired number of rotor core sheets 37 formed through pressing of thin steel sheets, for instance magnetic steel sheets, and punching of the slits 11. The positions of the slits 11 may be skewed in the circumferential direction, gradually or stepwise in desired increments.

In a case where the current that flows from the control device 2 includes components that are not synchronous with rotational speed, a problem may arise in that losses occur due to the flow of eddy currents, and efficiency decreases, when the rotor core 7 is formed of a material such as solid material or the like that is continuous in the axial direction.

In Embodiment 7 of the present invention, therefore, thin steel sheets are stacked to cut off thereby the path of eddy currents generated by the rotor core 7. As a result it becomes possible to reduce dramatically eddy current loss, and to elicit an effect of allowing the efficiency of the synchronous reluctance motor 1 to increase.

Embodiment 8

In Embodiment 7, preferably, there are formed rotor core assemblies 38 resulting from dividing the stacked rotor core sheets 37 into respective sets of plurality of sheets, the rotor core assemblies 38 being preferably stacked as described below. More preferably, the number of rotor core assemblies 38 that are to be grouped is set to a natural number multiple of a number being a factor, other than 1, of the number of poles.

For instance, the rotor core sheets 37 are divided into four rotor core assemblies 38A, 38B, 38C and 38D, as illustrated in FIG. 18, the widths of the assemblies being identical. Herein, 4 equals the number of poles of the synchronous reluctance motor 1 of Embodiment 8.

Figure 19:
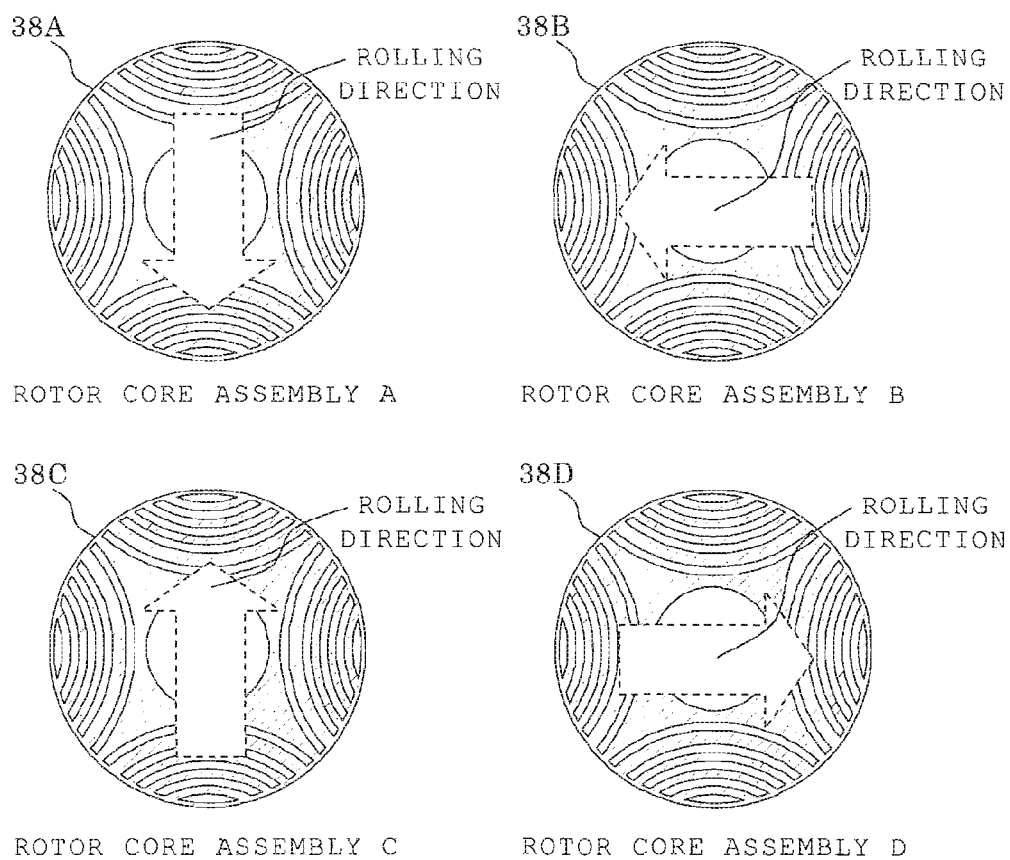
FIG. 19 is an explanatory diagram illustrating the rolling direction of rotor core assemblies in a synchronous reluctance motor according to Embodiment 8 of the present invention.

FIG. 19 is an explanatory diagram illustrating a rolling direction of the rotor core assemblies 38 in the synchronous reluctance motor 1 according to Embodiment 8 of the present invention. Next, thin steel sheets are stacked aligned in such a manner that the rolling directions thereof point in a respective direction illustrated in FIG. 19, to yield one respective rotor core assembly 38. The rotor core assemblies 38 are stacked according to the respective rolling directions illustrated in FIG. 19, to configure the rotor core 7 illustrated in FIG. 18.

In the example of FIG. 19, the rolling directions are rotated by 90° with respect to each other, the angle of rotation being thus equally divided among the rotor core assemblies 38. In a case where skew is to be imparted, the rolling directions are not aligned perfectly but are offset from each other by a skew angle, within a practicable range. By adopting this configuration, it becomes possible to reduce shape imbalance in the rotor core 7, arising from deviations in the sheet thickness of the thin steel sheets, and to obtain a high-efficiency synchronous reluctance motor 1.

In Embodiment 8 of the present invention, the number of rotor core assemblies 38 that are to be grouped is more preferably set to a natural number multiple of the number of poles. This configuration is identical to that illustrated in FIG. 18, but with a difference in that numbers being natural number multiples of factors of the number of poles are excluded herein. This configuration allows reducing pole imbalance, and hence a high-efficiency synchronous reluctance motor 1 can be obtained.

Embodiment 9

The characterizing feature of Embodiment 9 of the present invention is that crimps 39 are provided in order to fasten the stacked rotor core sheets 37 of the synchronous reluctance motor 1 of Embodiments 6 to 8 in the direction of the shaft 8.

Figure 20:
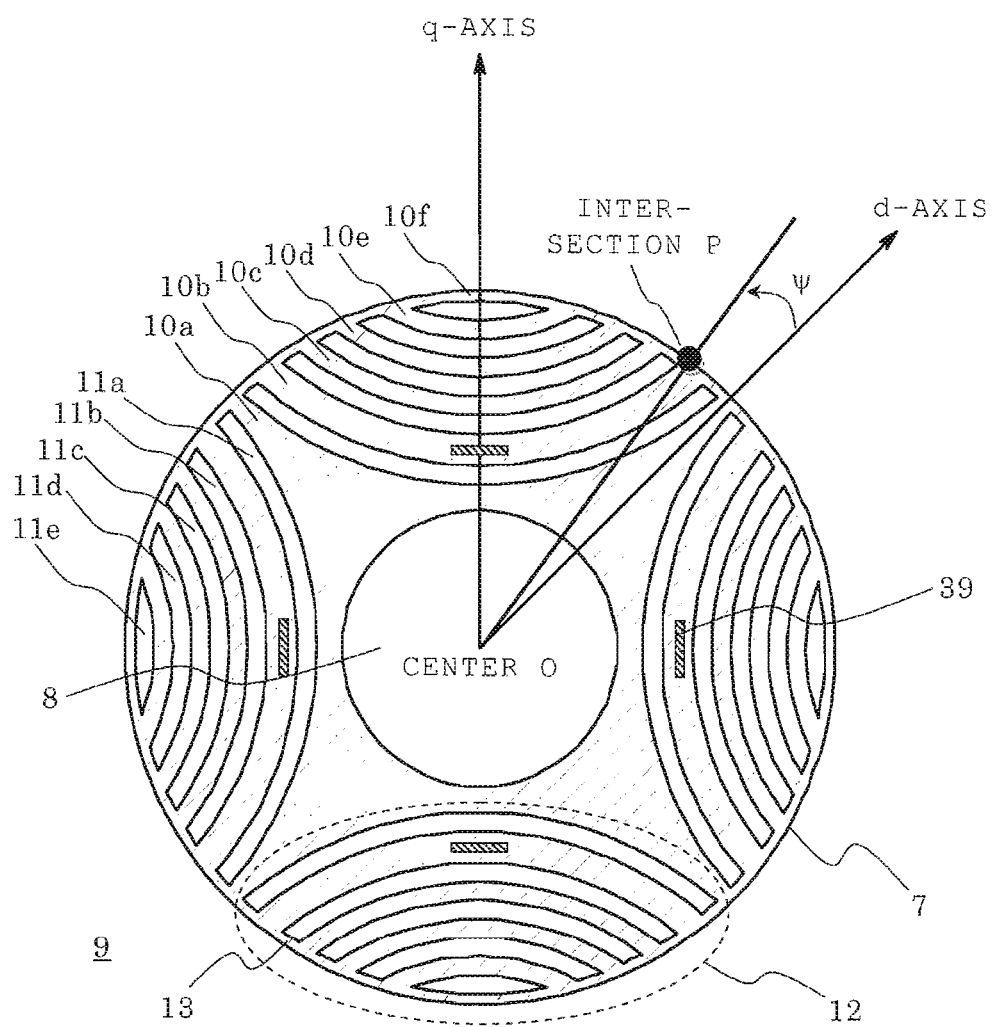
FIG. 20 is an explanatory diagram illustrating an example of positions of formation of crimps of rotor core sheets in a synchronous reluctance motor according to Embodiment 9 of the present invention.

FIG. 20 is an explanatory diagram illustrating an example of positions of formation of crimps 39 of the rotor core sheets 37 in the synchronous reluctance motor 1 according to Embodiment 9 of the present invention. Defining the intersection P of the outer periphery of the rotor 9 and a straight line that runs through the rotor center O and that is electrically rotated by the angle ψ from the d-axis, at least one crimp 39 in FIG. 20 is provided at a region of the core layer 10b that is formed at a closest position to the intersection P along the circumferential direction.

As is known, formation of the crimps 39 entails a degradation of the magnetic characteristic of the core in the periphery of the crimps 39. In Embodiment 9 of the present invention, therefore, the crimps 39 are formed in the thickest core layer 10 that is formed; thereby, the influence of degradation of magnetic characteristics can be suppressed significantly, and a high-efficiency synchronous reluctance motor 1 can be obtained thereby.

In Embodiment 9 of the present invention, preferably, the crimps 39 are formed to a shape that conforms to the shape of the slits 11. In FIG. 20, an example has been depicted in which one crimp 39 is provided in each respective core layer 10, but there may be provided a plurality of crimps 39 arranged identically, for instance as illustrated in FIG. 21, so as to obtain a desired fastening strength.

Figure 21:
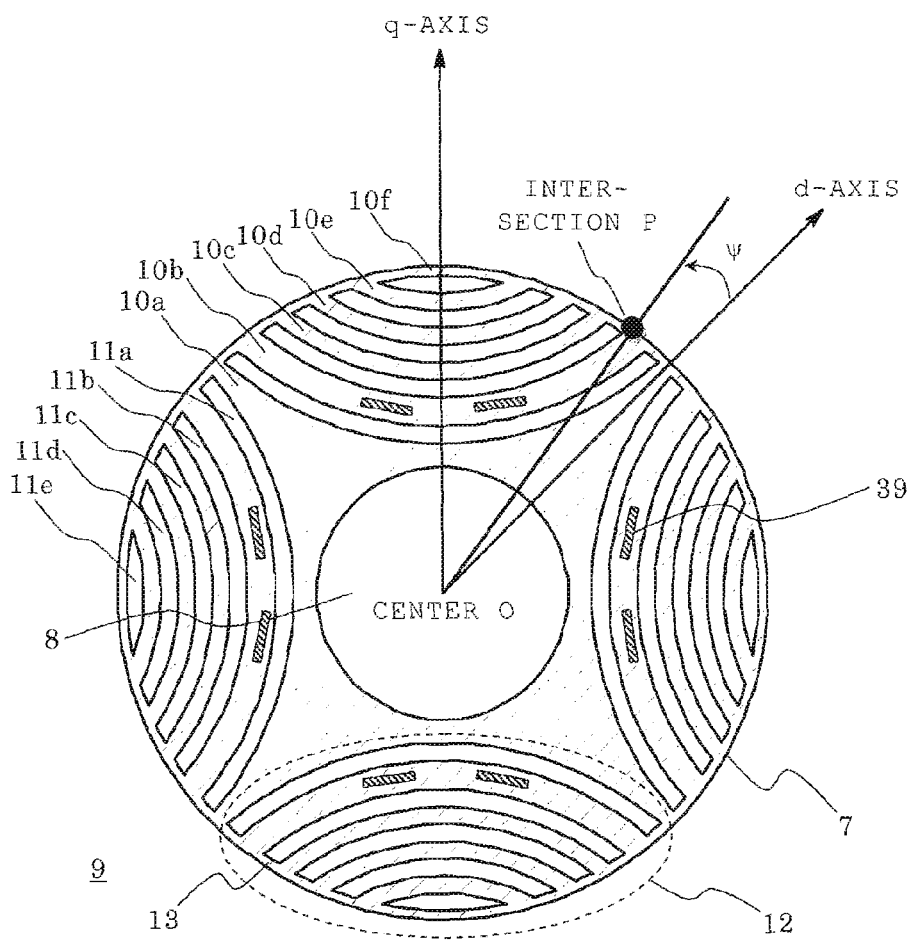
FIG. 21 is another explanatory diagram illustrating an example of positions of formation of crimps of rotor core sheets in the synchronous reluctance motor according to Embodiment 9 of the present invention.

FIG. 21 is another explanatory diagram illustrating the positions at which crimps 39 of the rotor core sheets 37 are formed in the synchronous reluctance motor 1 according to Embodiment 9 of the present invention. When providing a plurality of crimps 39, the latter may be preferably disposed so as to be line-symmetrical with respect to the q-axis, as illustrated in FIG. 21.

Embodiment 10

The characterizing feature of Embodiment 10 of the present invention is that the radial direction width of a bridge 13 (FIGS. 20 and 21) formed between the slits 11 and the outer periphery of the rotor core 7 is set to be equal to or smaller than twice the sheet thickness of the thin steel sheets. Preferably, specifically, thin steel sheets are used that have a sheet thickness in the range from about 0.35 to 1.0 mm, and the radial-direction width of the bridge 13 lies in the range from about 0.5 to 2 mm.

As is known, pressing and punching of magnetic steel sheets gives rise to degradation of magnetic characteristics over a distance of substantially half the sheet thickness, from the fracture surface of the punch, in the rolling plane. The bridge 13 fulfils the function of physically anchoring and integrating the plurality of core layers 10a to 10f that are formed through punching of the slits 11; the bridge 13 also forms a q-axis magnetic path.

It is obviously best that the q-axis inductance Lq be small, as described above, while the bridge 13 is an unnecessary portion in electromagnetic terms. Accordingly, by setting the radial direction width of the bridge 13 to be equal to or smaller than twice the sheet thickness of the thin steel sheets, the greater part of the bridge 13 is brought to state in which magnetic characteristics have degraded through press punching. Such a configuration allows preventing increases in the q-axis inductance Lq, and hence an effect can be elicited whereby output torque can be increased, and, by extension, motor efficiency can be likewise increased.

Embodiment 11

Figure 22:
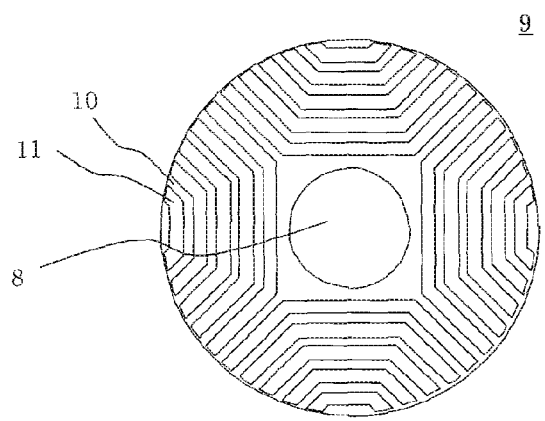
FIG. 22 is a cross-sectional diagram illustrating the rotor of a synchronous reluctance motor according to Embodiment 11 of the present invention.

FIG. 22 is a cross-sectional diagram illustrating the rotor 9 of the synchronous reluctance motor 1 according to Embodiment 11 of the present invention. In Embodiments 1 to 10 the slits 11 are shaped as arcs, but the slits 11 may be configured in the form of straight lines, as illustrated in FIG. 22. The same effect as in Embodiments 1 to 10 can be achieved herein by adopting the same features as in Embodiments 1 to 10. The slit shape may be a resembling shape, for instance a combination of arcs and straight lines.

The invention claimed is:

1. A synchronous reluctance motor, comprising:
a rotor configured by fixing a rotor core to a shaft, and with a stator having winding, said rotor and said stator being disposed rotatably relative to each other across a magnetic gap,
wherein said rotor core has as many flux barriers in a circumferential direction as a number of poles, said flux barriers being formed through alternate juxtaposition of one or more slits and core layers in a radial direction;
rotation of said synchronous reluctance motor is controlled through energization of said winding with current of a phase having a lead angle from a d-axis being set to a current carrying phase β;
when a ratio k is set to a ratio between a total sum of radial-direction widths of said slits on a q-axis and a magnetic gap length,
among said core layers, a radial-direction width, on the q-axis, of the core layer that lies at a position closest in the circumferential direction to a point P at which there intersects an outer periphery of said rotor and a straight line passing through a rotor center and drawn at an angle ψ=arctan(tan β/1+0.2k)) from the d-axis, is larger than radial-direction widths of the other core layers on the q-axis; and
said ratio k is set to a value higher than 34 and lower than 67.

2. The synchronous reluctance motor of claim 1, wherein said current carrying phase β is set to lie in a range from 66° to 75°.

3. The synchronous reluctance motor of claim 1, wherein said current carrying phase β inset to a value larger than 0° and smaller than 90°.

4. The synchronous reluctance motor of claim 1, wherein said current carrying phase β is set to lie in a range from 56° to 85°.

5. The synchronous reluctance motor of claim 1, wherein said current carrying phase β is set to lie in a range from arctan(1±0.2k)−5 (°) to arctan(1±0.2k)±5 (°).

6. The synchronous reluctance motor of claim 1, wherein said rotor core is formed through stacking of thin steel sheets in an axial direction of said shaft.

7. The synchronous reluctance motor of claim 6, wherein said rotor core is formed using a plurality of rotor core assemblies, each formed through stacking of rotor core sheets in which rolling directions of said thin steel sheets are aligned, said rotor core assemblies being stacked rotating the rolling directions of respective rotor core assemblies by identical angles.

8. The synchronous reluctance motor of claim 7, wherein a number of said rotor core assemblies is a natural number multiple of a factor of a number of poles of said rotor core.

9. The synchronous reluctance motor of claim 7, wherein a number of said rotor core assemblies is a natural number multiple of a number of poles of said rotor core.

10. The synchronous reluctance motor of claim 7, wherein at least one crimp formed per pole is formed in the core layer lying at a position that is closest, in the circumferential direction, to said point P at which there intersect the outer periphery of said rotor and the straight line passing through the rotor center and drawn at said angle $\psi$ from the d-axis.

11. The synchronous reluctance motor of claim 6, wherein a radial direction width of a bridge that is formed between said slits and the outer periphery of said rotor core is equal to or smaller than twice a sheet thickness of said thin steel sheets.

12. The synchronous reluctance motor of claim 1, wherein said angle $\psi$ is set to a value higher than 15 and lower than 20.

* * * * *

UNITED STATES PATENT AND TRADEMARK OFFICE
CERTIFICATE OF CORRECTION

PATENT NO. : 9,825,515 B2
APPLICATION NO. : 15/108167
DATED : November 21, 2017
INVENTOR(S) : Kazumasa Ito et al.

Page 1 of 1

It is certified that error appears in the above-identified patent and that said Letters Patent is hereby corrected as shown below:

In the Claims

Column 14, Line 54, Claim 5, change "arctan(1±0.2k)-5 (°) to arctan(1±0.2k)±5 (°)" to --arctan(1+0.2k)-5(°) to arctan (1+0.2k)+5(°)--.

Signed and Sealed this
Fourth Day of June, 2019

Andrei Iancu
*Director of the United States Patent and Trademark Office*